US008632259B2

(12) United States Patent
Shen et al.

(10) Patent No.: US 8,632,259 B2
(45) Date of Patent: Jan. 21, 2014

(54) OPTICAL FIBER CONNECTOR

(75) Inventors: Po-Hsun Shen, New Taipei (TW); Bing Su, Shenzhen (CN); Jun-Jin Pan, Shenzhen (CN); Leland Wang, Santa Clara, CA (US)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 187 days.

(21) Appl. No.: 13/411,730

(22) Filed: Mar. 5, 2012

(65) Prior Publication Data
US 2013/0051735 A1 Feb. 28, 2013

(30) Foreign Application Priority Data
Aug. 29, 2011 (CN) .......................... 2011 1 0250902

(51) Int. Cl.
*G02B 6/36* (2006.01)
(52) U.S. Cl.
USPC .............................................. 385/81; 385/76
(58) Field of Classification Search
USPC .................................... 385/81, 56, 58, 76, 84
See application file for complete search history.

(56) References Cited

U.S. PATENT DOCUMENTS

| 8,047,727 | B1 * | 11/2011 | Barnes et al. | 385/72 |
| 8,087,833 | B2 * | 1/2012 | Fantini et al. | 385/78 |
| 2009/0285534 | A1 * | 11/2009 | Ishikawa | 385/81 |
| 2011/0116749 | A1 * | 5/2011 | Kuffel et al. | 385/81 |
| 2012/0257859 | A1 * | 10/2012 | Nhep | 385/81 |
| 2013/0051735 | A1 * | 2/2013 | Shen et al. | 385/81 |

* cited by examiner

*Primary Examiner* — Sung Pak
(74) *Attorney, Agent, or Firm* — Altis Law Group, Inc.

(57) ABSTRACT

An optical fiber connector includes an inner housing and a fixing module sleeved in the inner housing. The fixing module includes a fixing mechanism having a supporting member and a clamping member. The supporting member includes a first fixing portion axially defining a first restricting groove, a first fixing end and a second fixing end at two opposite ends of the first fixing portion, and the clamping member includes a second fixing portion axially defining two sliding grooves on two borders of the second fixing portion. The fixing module further includes a locking member sleeved on the fixing mechanism, a position member fixed at the first fixing end of the fixing mechanism, and an elastic member sleeved on the fixing mechanism with an end of the elastic member resisting with the position member and the other end of the elastic member resisting with the locking member.

15 Claims, 7 Drawing Sheets

OPTICAL FIBER CONNECTOR

BACKGROUND

1. Technical Field

The present disclosure generally relates to optical fiber connectors, and particularly to an optical fiber connector that can conveniently assemble an optical fiber to the optical fiber connector.

2. Description of the Related Art

As the fiber to the home (FTTH) is widely used in communication field, many optical fiber connectors are needed for connecting the optical fiber. A typical optical fiber connector has an optical fiber holder and a clamp sleeve sleeved on the optical fiber holder. A clamp force of the optical fiber holder can be adjusted by sliding the clamp sleeve on the optical fiber holder. However, the clamp sleeve requires to be driven to slide repeatedly on the optical fiber holder when assembling the optical fiber, thus it is inconvenient to use. In addition, the clamp sleeve and the optical fiber holder goes through wear and tear due to the sliding of the clamp sleeve, therefore, the optical fiber eventually cannot be positioned accurately.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
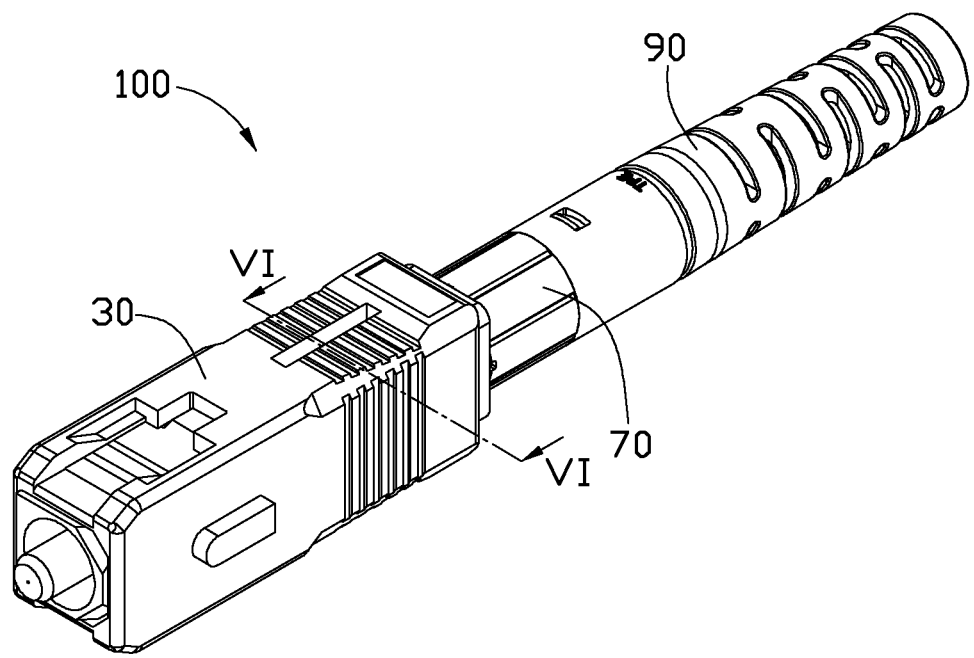
FIG. 1 is an isometric, assembled view of an embodiment of an optical fiber connector.
Figure 2:
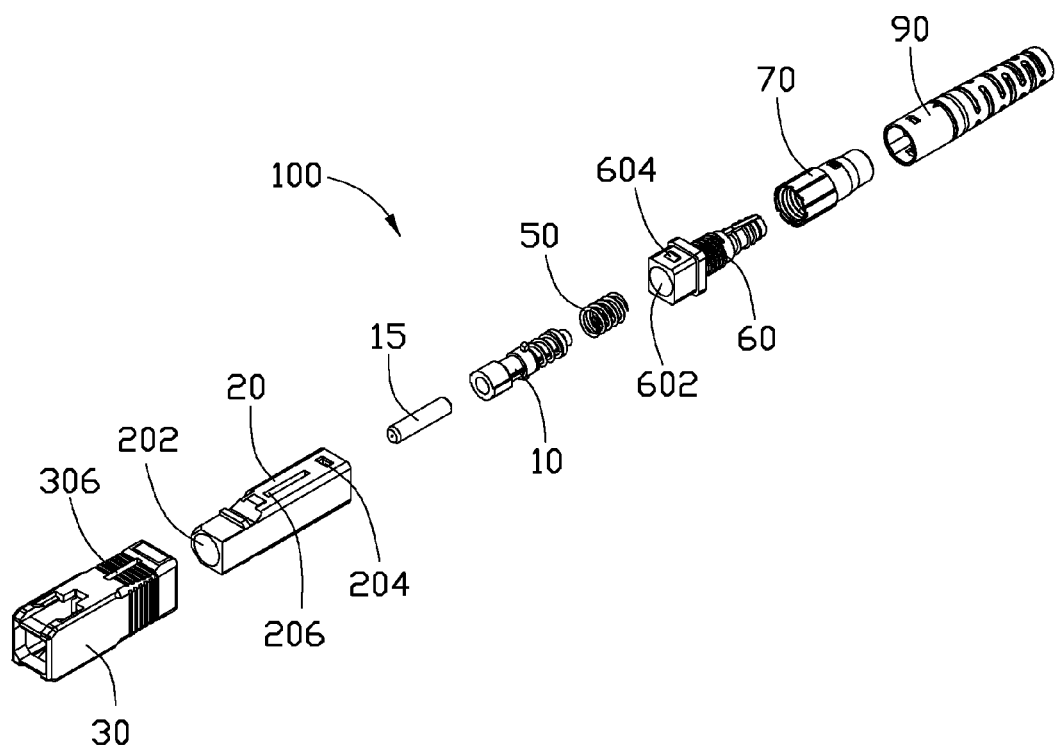
FIG. 2 is an exploded, isometric view of the optical fiber connector of FIG. 1, in which the optical fiber connector includes a fixing module.

Referring to FIGS. 1 and 2, an embodiment of an optical fiber connector 100 includes a fixing module 10, an optical fiber ferrule 15 positioned at an end of the fixing module 10, an inner housing 20 sleeved on the fixing module 10, an outer housing 30 sleeved on the inner housing 20, a resilient member 50, a resisting member 60, an end sleeve 70 sleeved on the resisting member 60, and a protective sleeve 90 fixed at an end of the end sleeve 70. In the illustrated embodiment, the optical fiber connector 100 is a Subscriber Connector (SC) optical fiber connector.

Figure 3:
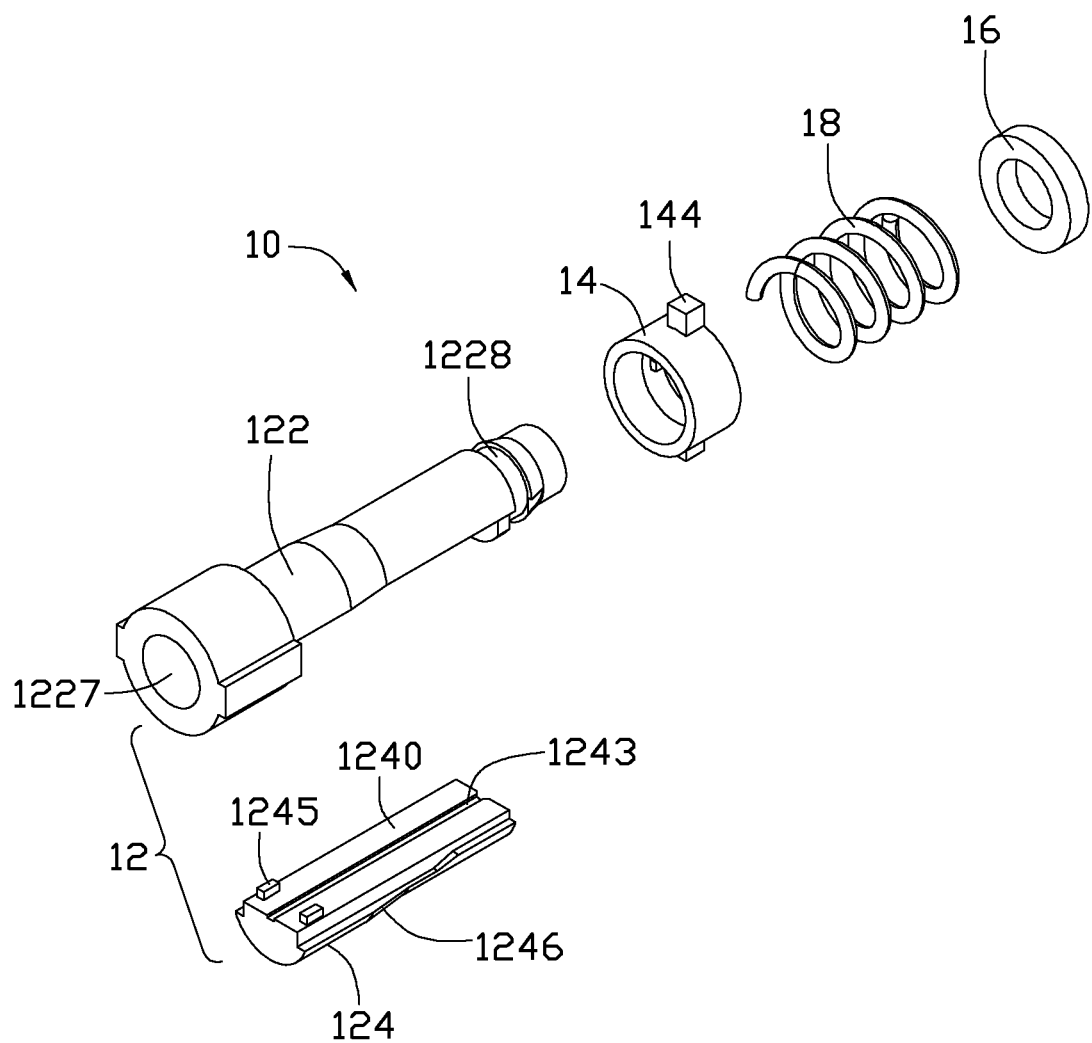
FIG. 3 is an exploded, isometric view of the fixing module of FIG. 2.
Figure 4:
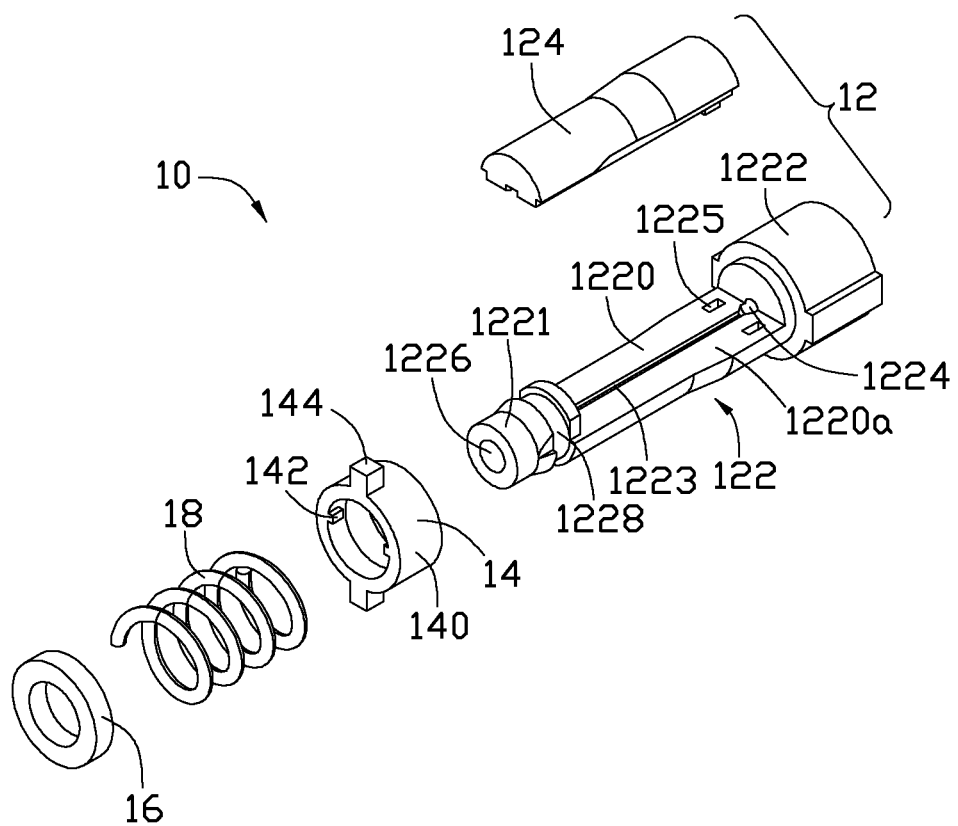
FIG. 4 is similar to FIG. 3, but viewed from another aspect.
Figure 5:
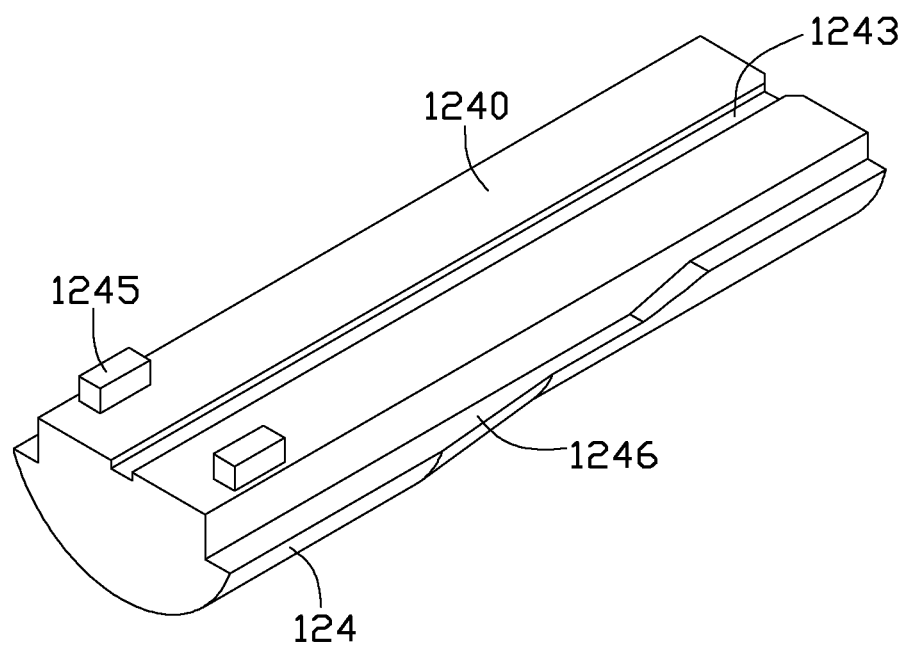
FIG. 5 is an isometric view of the clamping member of FIG. 3.

Referring to FIGS. 3 through 5, the fixing module 10 includes a fixing mechanism 12, a locking member 14 sleeved on the fixing mechanism 12, a position member 16 fixed at an end of the fixing mechanism 12, and an elastic member 18 sleeved on the fixing mechanism 12 between the locking member 14 and the position member 16.

The fixing mechanism 12 can be cylindrical, and the diameter of the fixing mechanism 12 gradually decreases from one end to the other end of the fixing mechanism 12. The fixing mechanism 12 includes a supporting member 122 and a clamping member 124. The supporting member 122 includes a first fixing portion 1220, a first fixing end 1221 and a second fixing end 1222 at two opposite ends of the first fixing portion 1220. In the illustrated embodiment, the diameter of the first fixing end 1221 is smaller than that of the second fixing end 1222. The first fixing portion 1220 includes a fixing surface 1220a. The fixing surface 1220a axially defines a first restricting groove 1223 for positioning an inserted optical fiber (not shown). The fixing surface 1220a further defines two positioning grooves 1225 at two opposite sides of the first restricting groove 1223 adjacent to the second fixing end 1222. Two guide grooves 1224 are defined on two opposite ends of the first restricting groove 1223. The first fixing end 1221 axially defines a first connecting hole 1226 communicating with the first restricting groove 1223. The first fixing end 1221 further defines a positioning groove 1228 at the outer surface thereof to fix the position member 16. In the illustrated embodiment, the positioning groove 1228 is a circular groove. The second fixing end 1222 axially defines a second connecting hole 1227 communicating with the first restricting groove 1223.

The shape of the clamping member 124 is similar to the shape of the first fixing portion 1220 of the supporting member 122. The clamping member 124 and the first fixing portion 1220 cooperatively form a cylindrical structure to fix the optical fiber inserted into the fixing module 10, and the diameter of the cylindrical structure gradually decreases from the second fixing end 1222 to the first fixing end 1221. The clamping member 124 forms a second fixing portion 1240 facing the fixing surface 1220a. In the illustrated embodiment, the second fixing portion 1240 is a flat surface. The second fixing portion 1240 axially defines a second restricting groove 1243 corresponding to the first restricting groove 1223. The second fixing portion 1240 forms two limiting protrusions 1245 at two opposite sides of the second restricting groove 1243, and the limiting protrusions 1245 are received in the two positioning grooves 1225, respectively. The second fixing portion 1240 further axially defines two sliding grooves 1246 located symmetrically opposite to each other on two borders of the second fixing portion 1240. In the illustrated embodiment, each of the two sliding grooves 1246 is a stepped groove. Each of the sliding grooves 1246 is divided into three consecutive parts, the bottoms of two of the parts located at two opposite ends of each of the two sliding grooves 1246 are both parallel to the second fixing portion 1240. The radial depth of the two sliding grooves 1246 gradually decrease from the second fixing end 1222 to the first fixing end 1221.

In an alternative embodiment, any one of the two guide grooves 1224 can be omitted. The second restricting groove 1243 can also be omitted. Each of the sliding grooves 1246 can be broken into one part, two parts, or more than three parts.

The locking member 14 is a sleeve that is sleeved on the fixing mechanism 12 to lock the fixing mechanism 12 to fix the optical fiber inserted into the fixing mechanism 12. The locking member 14 includes an annular main body 140, two opposite sliding protrusions 142 formed at the inner wall of the annular main body 140 to be received in the two sliding grooves 1246, respectively, and two opposite operation portions 144 formed at the outer surface of the main body 140. Each of the two sliding protrusions 142 correspondingly received in the two sliding grooves 1246, and the locking member 14 can slide along the two sliding grooves 1246 from one end to the other end of the sliding grooves 1246 to lock or unlock the optical fiber inserted into the fixing mechanism 12.

The position member 16 is fixed in the positioning groove 1228, and is a sleeve that is sleeved on the fixing mechanism 12. The elastic member 18 is a spring sleeved on the fixing mechanism 12. In the illustrated embodiment, an end of the elastic member 18 resists with the position member 16, and the other end of the elastic member 18 resists with the locking member 14.

Referring again to FIG. 2, the inner housing 20 sleeves on the fixing module 10. The inner housing 20 defines a stepped hole 202 in an end, and two positioning grooves 204 in two opposite side walls of the inner housing 20 at the other end thereof. In the middle section of the two opposite side walls of the inner housing 20, two sliding slots 206 are further defined. Each of the two sliding slots 206 is a long and narrow groove.

The outer housing 30 sleeves on the inner housing 20, and defines two sliding slots 306 communicating with the two sliding slots 206, respectively, to facilitate to operate the locking member 14. In the illustrated embodiment, the outer housing 30 is shaped to facilitate to install the optical fiber connector 100 to a SC adapter (not shown).

In an alternative embodiment, the outer housing 30 can be shaped to facilitate to install the optical fiber connector 100 to a FC, LC or other fiber optic adapter.

The resilient member 50 is a compression spring to fix the fixing module 10. In the illustrated embodiment, the resisting member 60 axially defines a stepped hole 602 in a proximal end thereof adjacent to the fixing module 10. Two positioning portions 604 opposite to each other, corresponding to the positioning grooves 204, are formed on the outer surface of the proximal end of the resisting member 60. The end sleeve 70 is a sleeve sleeved on an end of the resisting member 60 away from the stepped hole 602. The protective sleeve 90 is an elastic sleeve fixed at a distal end of the end sleeve 70.

Figure 6:
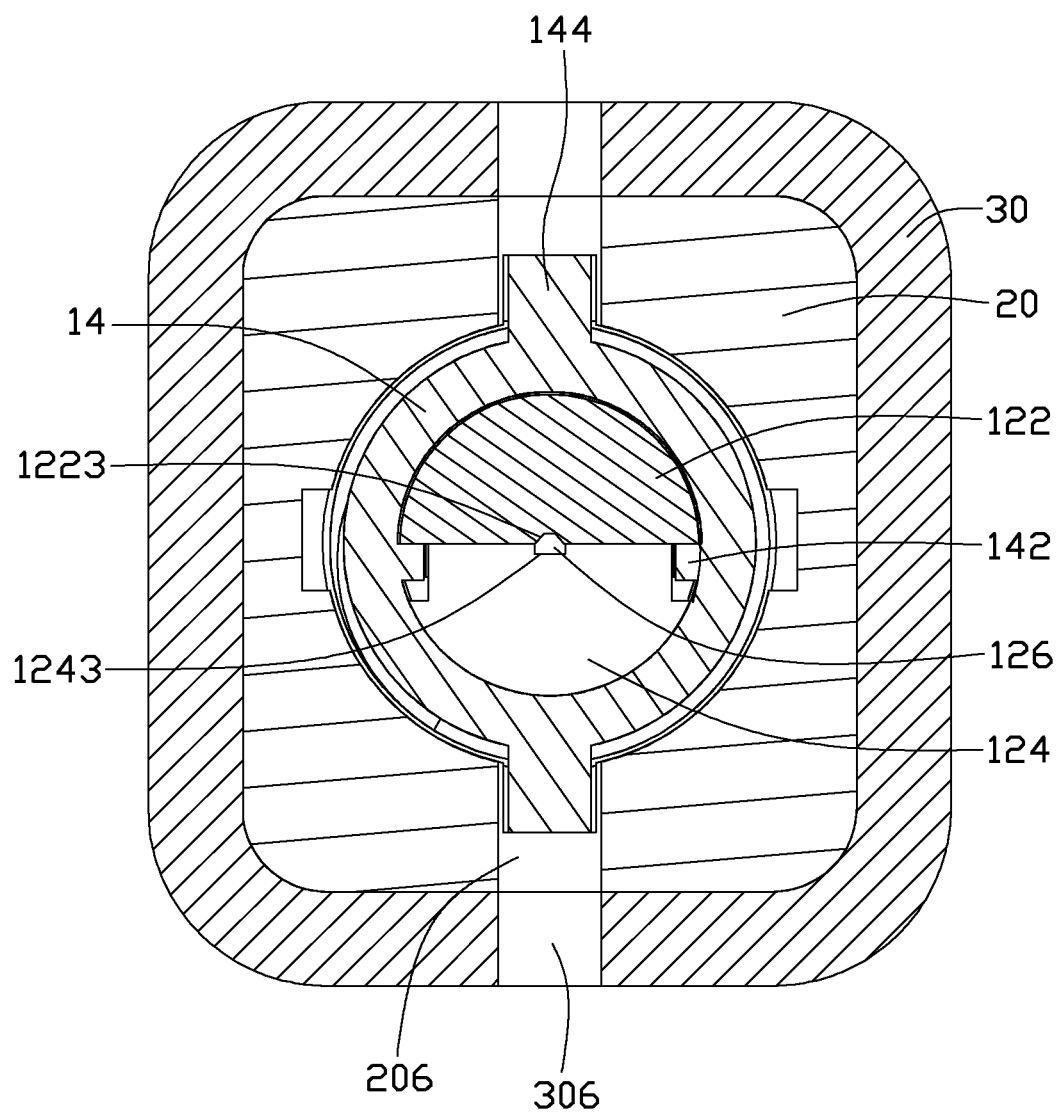
FIG. 6 is a cross-sectional view of the optical fiber connector of FIG. 1 taken along the line VI-VI.

Referring to FIG. 6, in assembly of the optical fiber connector 100, the clamping member 124 is positioned on the first fixing portion 1220 of the supporting member 122. The locking member 14 is sleeved on the fixing mechanism 12. The elastic member 18 is sleeved on the fixing mechanism 12, and the position member 16 is fixed in the positioning groove 1228. At this time, the elastic member 18 drives the locking member 14 to slide to the second fixing end 1222 until the two limiting protrusions 1245 are received in the two positioning grooves 1225 correspondingly and the first restricting groove 1223 and the second restricting groove 1243 cooperatively form a receiving hole 126 (as shown in FIG. 6) to receive the optical fiber inserted into the fixing module 10.

The optical fiber ferrule 15 is fixed in the second connecting hole 1227 of the fixing module 10. The inner housing 20 is sleeved on the fixing module 10 with the second fixing end 1222 resisting with the bottom surface of the stepped hole 202 and the two operation portions 144 slidably received in the two sliding slots 206 respectively. The resilient member 50 is received in the stepped hole 602 of the resisting member 60, and the resisting member 60 is fixed to the inner housing 20 with the two positioning portions 604 engaging in the two positioning grooves 204 respectively. An end of the resilient member 50 resists with the bottom surface of the stepped hole 602 and the other end of the resilient member 50 resists with the position member 16. The outer housing 30 is sleeved on the inner housing 20 with the two sliding slots 306 communicating with the two sliding slots 206 respectively. The end sleeve 70 is fixed at an end of the resisting member 60 away from the inner housing 20. The protective sleeve 90 is fixed at an end of the end sleeve 70 away from the resisting member 60.

Figure 7:
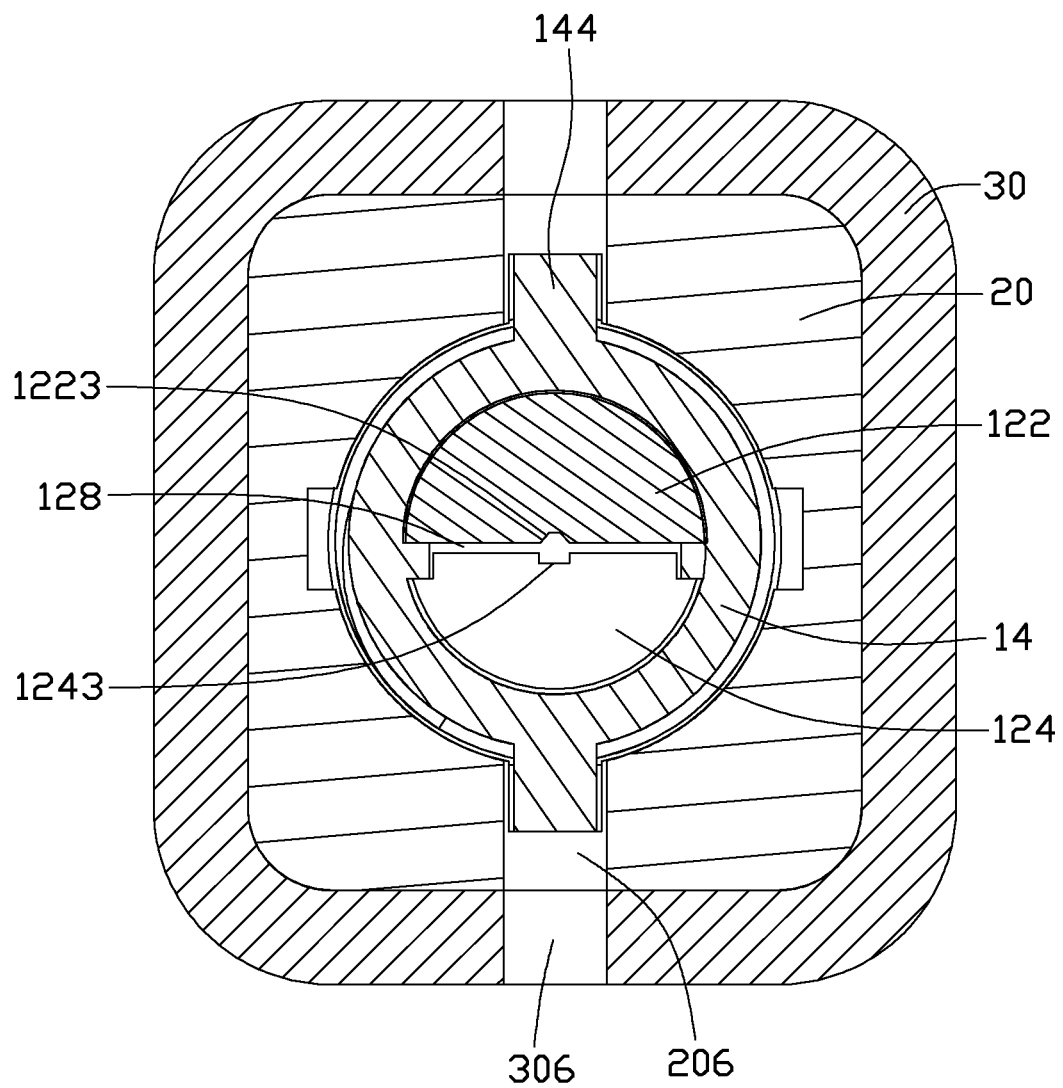
FIG. 7 is similar to FIG. 6, but showing the optical fiber connector in a disengaged state.

Referring to FIGS. 1 through 7, in use, the operation portions 144 is pushed to drive the locking member 14 to slide along the sliding grooves 1246 towards the first fixing end 1221 of the fixing module 10. As the radial depth of the sliding grooves 1246 gradually decrease from the second fixing end 1222 to the first fixing end 1221, the clamping member 124 moves towards the direction away from the supporting member 122, therefore, a gap 128 (as shown in FIG. 7) is generated between the clamping member 124 and the supporting member 122, and the elastic member 18 is deeply compressed to generated a resilient force. Then, the optical fiber is inserted into the optical fiber connector 100, and received in the first restricting groove 1223. The inserted optical fiber is optically coupled to the optical fiber ferrule 15.

By loosening the operation portions 144, the elastic member 18 decompresses and drives the locking member 14 back towards the second fixing end 1222 until the clamping member 124 resisting with the supporting member 122 and the two limiting protrusions 1245 received in the two positioning grooves 1225 correspondingly. The inserted optical fiber is fixed in the receiving hole 126 of the optical fiber connector 100.

In assembly of the inserted optical fiber to the optical fiber connector 100, an operator only needs to push the locking member 14, and to insert the optical fiber to the optical fiber connector 100. The optical fiber connector 100 automatically clamps the optical fiber. Therefore, the optical fiber connector 100 is convenient for assembling of the optical fiber, and has higher assembly precision.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An optical fiber connector for fixing an optical fiber comprising:
    an inner housing; and
    a fixing module sleeved in the inner housing, the fixing module comprising:
    a fixing mechanism comprising a supporting member and a clamping member cooperatively forming a cylindrical structure to fix the optical fiber inserted into the fixing module, the supporting member comprising a first fixing portion axially defining a first restricting groove, a first fixing end and a second fixing end at two opposite ends of the first fixing portion, the clamping member comprising a second fixing portion axially defining two sliding grooves on two borders of the second fixing portion;
    a locking member sleeved on the fixing mechanism, the locking member comprising an annular main body and two sliding protrusions formed at the inner wall of the annular main body, the sliding protrusions are opposite to each other, and the two sliding protrusions sliding along the two sliding grooves respectively;
    a position member fixed at the first fixing end of the supporting member; and
    an elastic member sleeved on the fixing mechanism with an end of the elastic member resisting with the position member and the other end of the elastic member resisting with the locking member, wherein the diameter of the fixing mechanism gradually decreases from the second fixing end to the first fixing end, and the radial depth of the two sliding grooves gradually decrease from the second fixing end to the first fixing end.

2. The optical fiber connector of claim 1, wherein the clamping member and the first fixing portion cooperatively form a cylindrical structure, the diameter of the cylindrical structure gradually decreases from the second fixing end to the first fixing end.

3. The optical fiber connector of claim 1, wherein each of the two sliding grooves is a stepped groove.

4. The optical fiber connector of claim 3, wherein each of the two sliding grooves is divided into three consecutive parts, the bottoms of two of the parts at two opposite ends of each of the two sliding grooves are both parallel to the second fixing portion.

5. The optical fiber connector of claim 1, wherein the second fixing portion axially defines a second restricting groove corresponding to the first restricting groove, the two sliding grooves are positioned at two opposite sides of the second restricting groove, the first restricting groove and the second restricting groove cooperatively form a receiving hole to receive the optical fiber inserted into the fixing module.

6. The optical fiber connector of claim 1, wherein the first fixing portion further defines two positioning grooves at two opposite sides of the first restricting groove adjacent to the second fixing end, the clamping member further comprises two limiting protrusions, and the two limiting protrusions engaging in the two positioning grooves respectively.

7. The optical fiber connector of claim 1, wherein the first fixing end defines a positioning groove at the outer surface of the first fixing end, and the position member is fixed in the positioning groove.

8. The optical fiber connector of claim 1, wherein the optical fiber connector further comprises an optical fiber ferrule, the first fixing end axially defines a first connecting hole communicating with the first restricting groove, the second fixing end axially defines a second connecting hole communicating with the first restricting groove, and the optical fiber ferrule is fixed at the second connecting hole.

9. The optical fiber connector of claim 1, wherein at least an end of the first restricting groove defines a guide groove.

10. The optical fiber connector of claim 1, wherein the locking member further comprises two opposite operation portions formed at the outer surface of the main body, the inner housing define two sliding slots corresponding to the two operation portions respectively at two opposite side walls of the inner housing.

11. The optical fiber connector of claim 10, wherein the optical fiber connector further comprises an outer housing sleeved on the inner housing, the outer housing is shaped to facilitate to install the optical fiber connector to a SC adapter.

12. The optical fiber connector of claim 11, wherein the outer housing defines two sliding slots communicating with the two sliding slots of the inner housing to facilitate to operate the locking member.

13. The optical connector of claim 1, wherein the optical fiber connector further comprises a resisting member axially defines a stepped hole in a proximal end of the resisting member adjacent to the fixing module and a resilient member received in the resisting member, the resisting member is fixed to the inner housing with an end of the resilient member resisting with the bottom surface of the stepped hole of the resisting member and the other end of the resilient member resisting with the position member.

14. The optical connector of claim 13, wherein the optical fiber connector further comprises an end sleeve sleeved on an end of the resisting member away from the stepped hole.

15. The optical connector of claim 14, wherein the optical fiber connector further comprises a protective sleeve fixed at a distal end of the end sleeve.

* * * * *